(12) United States Patent
Nesseth

(10) Patent No.: US 7,712,233 B2
(45) Date of Patent: May 11, 2010

(54) PARTICULATE MATERIAL SPREADING APPARATUS

(76) Inventor: Clinton A. Nesseth, 1101 19th St., Cameron, WI (US) 54822

( * ) Notice: Subject to any disclaimer, the term of this patent is extended or adjusted under 35 U.S.C. 154(b) by 0 days.

(21) Appl. No.: 10/962,294

(22) Filed: Oct. 8, 2004

(65) Prior Publication Data

US 2005/0145399 A1 Jul. 7, 2005

Related U.S. Application Data

(60) Provisional application No. 60/510,949, filed on Oct. 10, 2003.

(51) Int. Cl.
*B65G 33/00* (2006.01)
(52) U.S. Cl. ............... 37/420; 37/247; 37/262; 37/409; 222/412
(58) Field of Classification Search ............ 37/206, 37/207, 247, 249, 250, 253–255, 257, 266, 37/407, 420, 422, 423, 903, 260, 261, 262, 37/444, 107, 901, 419, 416, 425, 426, 427, 37/428, 431, 409; 56/400; 239/661, 672, 239/673, 689, 676, 675; 222/410, 412
See application file for complete search history.

(56) References Cited

U.S. PATENT DOCUMENTS

| | | | | | |
|---|---|---|---|---|---|
| 3,294,407 | A | * | 12/1966 | Vander Pol | 239/148 |
| 3,738,028 | A | * | 6/1973 | Reinhardt | 37/416 |
| 3,934,363 | A | * | 1/1976 | McMurray | 37/351 |
| 4,055,255 | A | * | 10/1977 | Vasquez | 414/21 |
| 4,084,853 | A | * | 4/1978 | Keenan | 298/24 |
| 4,407,622 | A | * | 10/1983 | Ito | 414/468 |
| 4,712,717 | A | * | 12/1987 | Egerdahl | 239/661 |
| 5,265,809 | A | * | 11/1993 | Kuhn et al. | 239/675 |
| 5,269,604 | A | * | 12/1993 | Ewers | 366/277 |
| 5,353,851 | A | * | 10/1994 | Cline | 141/256 |
| 5,386,943 | A | * | 2/1995 | Peeters | 239/675 |
| 5,501,404 | A | * | 3/1996 | Meyer et al. | 239/676 |
| 5,564,886 | A | * | 10/1996 | Emerson et al. | 414/725 |
| 5,592,760 | A | * | 1/1997 | Kohout | 37/403 |
| 5,827,038 | A | * | 10/1998 | Barden | 414/725 |
| 5,957,394 | A | * | 9/1999 | Becker | 239/673 |
| 6,056,066 | A | * | 5/2000 | Wells et al. | 172/71 |
| 6,193,403 | B1 | * | 2/2001 | Nystrom | 366/26 |

OTHER PUBLICATIONS

"Sash Sand Shooter," http://www.berlon.com/; BERLON Industries LLC, 1 page, © 2004.

(Continued)

*Primary Examiner*—Thomas B Will
*Assistant Examiner*—Jamie L McGowan
(74) *Attorney, Agent, or Firm*—Charles E. Golla; Merchant & Gould, P.C.

(57) ABSTRACT

To prevent or minimize bridging of material to be dispersed within a containment vessel, a rotatable auger is positioned in close proximity to a curvilinear inner wall surface of the vessel. The auger has an axis that moves parallel to the curved wall surface in a manner such that the auger flights maintain a close working relationship relative to the curved wall surface as the auger is positioned for movement therealong. A spreader apparatus is positioned to receive material dispensed through the vessel outlet port to broadcast the dispensed material externally of the vessel.

10 Claims, 10 Drawing Sheets

OTHER PUBLICATIONS

"Side Discharge Buckets," http://www.ceattach.com/cea/ceaweb.store/42bld16a028184222740c0a8c70206ee/Catalog/SSL-SIDEBKT; ceattachmentsinc., 1 page, © 2004.

"Skid Steer Stall Fillers," http://www.artexfab.com/Equipment/throwers.htm; 1 page, printout date Jun. 16, 2005.

* cited by examiner

PARTICULATE MATERIAL SPREADING APPARATUS

CROSS-REFERENCE TO RELATED APPLICATION

This application claims the benefit of U.S. Provisional Application Ser. No. 60/510,949, filed on Oct. 10, 2003 entitled PARTICULATE MATERIAL SPREADING APPARATUS. Such application is incorporated herein by reference.

FIELD OF THE INVENTION

This invention relates generally to material handling and distribution and more particularly to an improved apparatus and method for moving and spreading particulate material from a carrier vessel.

BACKGROUND OF THE INVENTION

Spreaders for particulate material have many uses, and exist in widely diverse configurations. Such spreaders can be mounted on stationary structures for repeatedly spreading material over the same area, or can be mounted for movement such as on or by a vehicle, for selectively spreading material over different areas as directed by movement of the vehicle or parts thereof. For example, sand and road salt spreaders are commonly attached to the back of highway maintenance trucks for spreading the sand or salt over icy or slippery road surfaces. Other applications, as for example in the agricultural, dairy and livestock industries use mobile spreaders for dispersing bedding materials such as wood shavings, chopped straw or sawdust in animal shelters and barn stalls. Such spreaders may be attached to scoops or buckets that are attached to and moved by tractors, skid steered vehicles, or the like. Such spreading equipment can also be used for spreading other particulate materials such as feed corn or grains in animal feed lots, for grain tanks, or for spreading top soil or other particulate landscape materials.

In most such mobile spreading structures, the actual spreader mechanism is generally operatively attached to a movable vessel or container that is configured to retainably hold a quantity or charge of the material to be dispensed. The vessel could, for example, be the bed of a dump truck, a towed trailer bed or tank, or a bucket of a tractor, a front-end loader, or a skid steer vehicle. Such vessels are generally configured to tip or otherwise be moved in a manner such that the material carried thereby is movable within the vessel toward and into an adjacent spreading apparatus. For example, a load of sand carried by a highway maintenance dump truck bed typically slides by gravity toward the back of the truck bed as the bed is raised, and into a spreader mechanism located at the back of the truck. The spreader mechanism typically includes a movable disk or vane member that is rotatable about a generally vertical axis and flings or throws material dropped onto it outwardly in broadcasting dispersing manner away from the spreader, such as across a highway surface behind the truck.

A common problem associated with such vessel supplied spreading equipment is the bridging of the material carried by the vessel as the material is directed by gravity out of the vessel and into the spreader mechanism. In the process of moving along and out of the containment vessel, the material to be spread is generally required to pass through a narrowed-down portion of the vessel or through an outlet port thereof leading to the spreader apparatus. Such material flow restriction and the general cohesive nature of the material to be spread further encourages bridging of the material within the vessel, at a position spaced upwardly from the vessel outlet and the spreader apparatus inlet, thereby disruptively interrupting the spreading process.

One way of breaking the bridged dams of material within the containment vessel is to bang or jerk the vessel body so as to dislodge the bridged material. This process is undesirable, unreliable and not particularly effective in situations where the apparatus operator cannot readily or continually observe the vessel contents during the spreading operation, and may be unaware of a material bridging situation. Another technique that has been employed with tractor or loader buckets has been to fixedly mount an auger adjacent the lower inside surface of the bucket to both direct the material laterally to a spreader located at one end of the bucket and in an attempt to address the bridging problem in the bucket. Such augers did generally not solve the material bridging problems of such buckets, which now enabled the material to bridge at a position overlying the auger surface. The next attempted solution was to place a second or multiple rotatable paddle wheels or beater structures within the bucket, spaced upwardly from and overlying the lower auger in generally parallel manner, to continually move and agitate the material overlying the auger in hope of minimizing bridging thereof. Such systems are generally expensive, are fairly complex and high maintenance structures, and still do not work well or efficiently.

The present invention addresses the described deficiencies of prior art vessel material containment and spreader combination configurations by providing a relatively simple, reliable and cost effective material dispensing and method that minimizes material bridging within the vessel and provides for uniform and smooth spreading dispersal of the material from the vessel.

SUMMARY OF THE INVENTION

The invention provides an improved apparatus and method for spreading materials from a material containment vessel which prevents or minimizes the bridging of the material to be dispersed within the containment vessel. The invention incorporates a rotatable auger positioned in close proximity to a curvilinear inner wall surface of the vessel and having an axis that moves parallel to the curved wall surface in a manner such that the auger flights maintain a close working relationship relative to the curved wall surface as the auger is positioned for movement therealong. The invention covers relative movement and positioning of the auger relative to the vessel inner surface, whether the auger is moved relative to the vessel surface or whether the vessel surface is moved relative to the auger. The apparatus and method of this invention minimizes material bridging within the vessel by enabling removal of material to be dispersed by the spreading apparatus from the upper surface of the contained material within the vessel.

According to one aspect of the invention there is provided a material dispensing apparatus including a vessel configured to retainably hold a change of material to be dispensed and having at least one broad inner curvilinear wall and defining an outlet port through which the material is dispersed from the vessel. An auger is positioned within the vessel with its axis of rotation generally parallel to the vessel's inner curvilinear wall surface and having a plurality of flights operable to move material within the vessel toward the outlet port. An operator apparatus positions the auger and curvilinear wall surface for relative cooperative movement such that the auger flights arcuately move along and in close proximity to the wall surface to dispense material from the vessel.

A spreader apparatus may be positioned to receive material dispensed through the vessel outlet port to broadcast the dispensed material externally of the vessel. Accordingly to one embodiment of the invention, the vessel comprises a bucket member. The vessel may be configured for attachment to a vehicle. The operator apparatus can be configured to move the auger relative to the vessel wall, or to move the vessel wall relative to the auger.

These and other features of the invention will be better appreciated upon reading of the following detailed description of one embodiment of the invention.

BRIEF DESCRIPTION OF THE DRAWING

Referring now to the Drawing, wherein like numerals represent like parts throughout the several views.

DETAILED DESCRIPTION OF THE INVENTION

Figure 1:
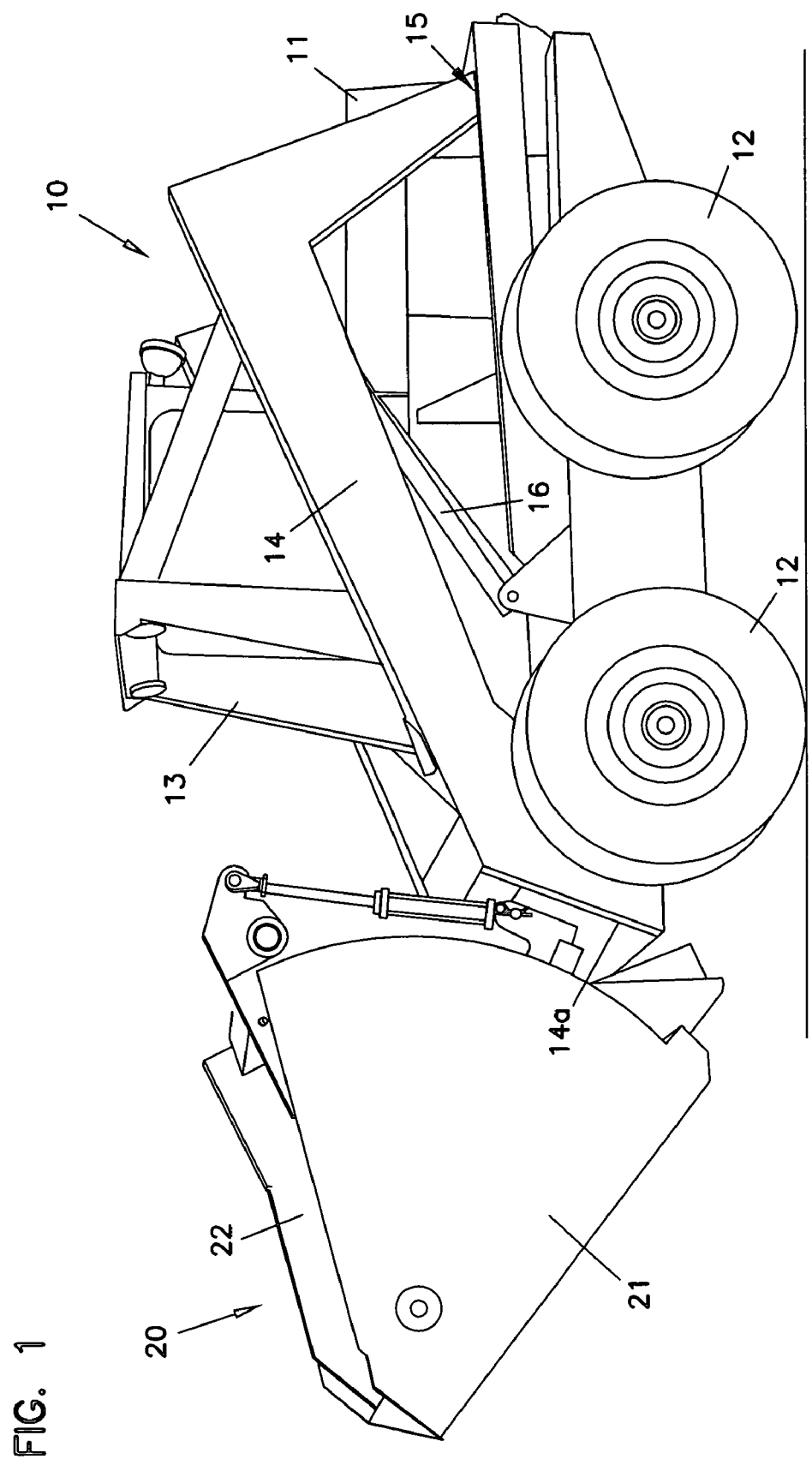
FIG. 1 is a left side perspective view of a skid steerable vehicle to which is mounted a spreading bucket configuration incorporating the principles of the invention.
Figure 2:
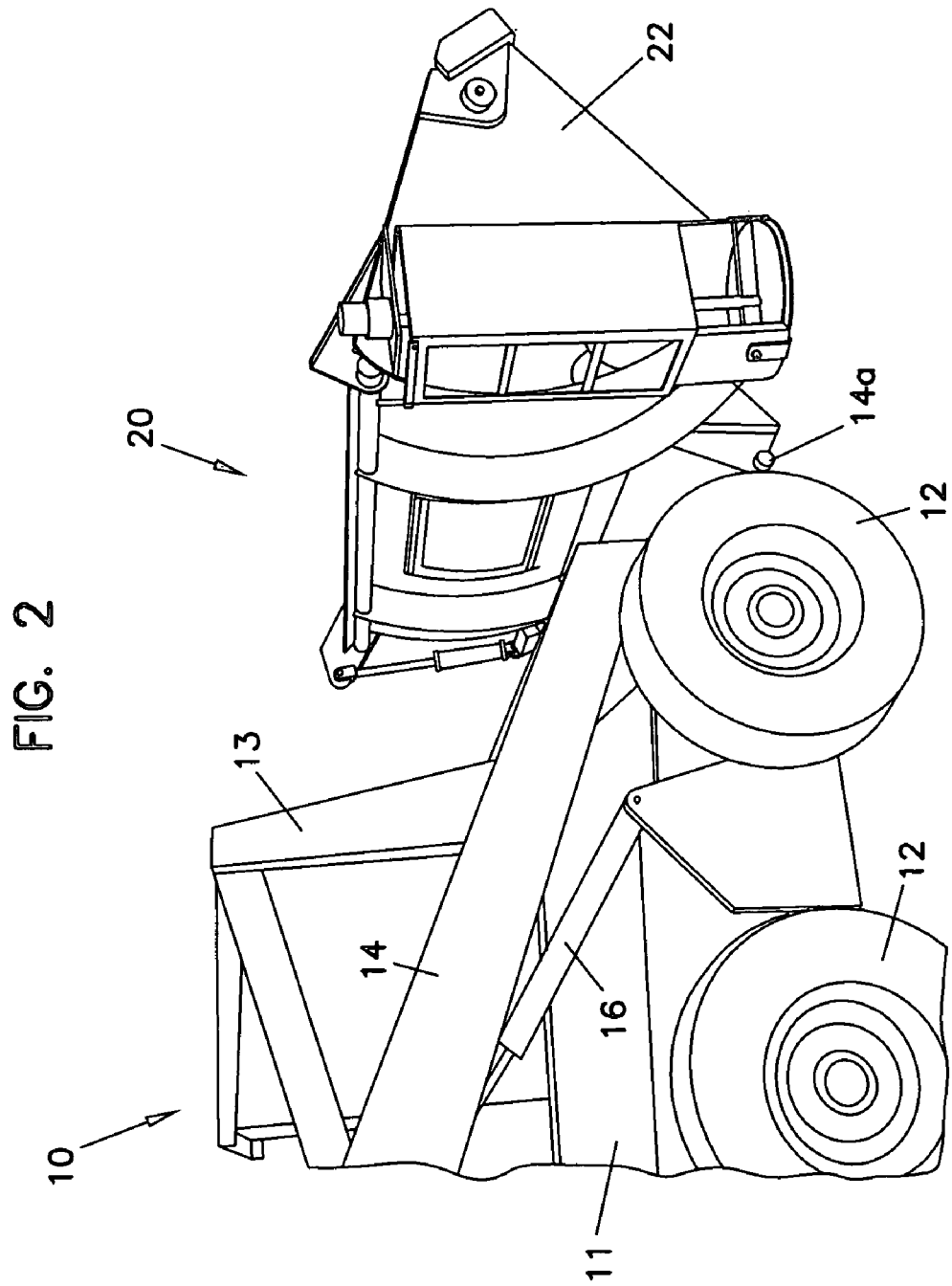
FIG. 2 is a partial right rear perspective view of the skid steerable vehicle and spreading bucket assembly of FIG. 1, illustrating in more detail the rear portion of the spreading bucket assembly.

Referring to the Figs., there is generally illustrated therein a preferred embodiment of a spreading bucket assembly that incorporates the principles of this invention. In FIGS. 1 and 2, the spreading bucket assembly is illustrated as attached to and being movable by a skid steerable vehicle 10. It will be understood that the invention is not limited to use with a skid steerable vehicle, or to the particular configuration of the spreading bucket assembly illustrated in FIGS. 1-10, but that the skid steerable vehicle and the particular spreading bucket configurations illustrated in the Drawing are simply representative of one embodiment of a containment vessel and vessel moving assembly combination that can be used to practice the principles of this invention.

Referring to FIGS. 1 and 2, the skid steerable vehicle 10 generally includes a chassis 11 containing an engine and power train for moving and operating the vehicle. The vehicle includes a plurality of wheels, generally indicated at 12, for moving the vehicle over the ground or support surface. In a skid steerable vehicle, the vehicle turns by locking one or more of the wheels while powering the others in a manner well known in the art. The vehicle 10 typically has a cab portion 13 wherein an operator sits to control the vehicle, and a primary pair of pivotably movable lift arms 14 that can be raised and lowered about their rear pivot positions, generally indicated at 15 to raise and lower the forward ends 14a of the operator arms 14 relative to the ground or support surface. A pair of hydraulic lift cylinders 16 provide the motive force for rotatably moving the operator arms 14. The skid steerable vehicle 10 also has a universal mounting bracket assembly (not illustrated in the Figs.) pivotably connected to the forward ends 14a of the operator arms 14 which provides detachable mounting and connection to various implements such as the spreader bucket assembly of the present invention generally indicated at 20. Other implements such as grading blade configurations, fork lift members, and the like can be detachably secured to the universal mounting bracket assembly in manners well known in the art. The mounting bracket is movable and pivotable relative to the forward ends 14a of the operator arms 14 by one or more hydraulic cylinders (not illustrated) to pivotally move the mounting brackets and attached implements relative to the forward ends 14a of the operator arms 14.

Since configurations and operations of such skid steerable vehicles are well known in the art, further details thereof will not be provided herein, it being understood that those skilled in the art clearly understand the nature of such vehicles and how they operate in numerous versatile situations. Skid steerable vehicles such as that generally illustrated at 10 typically include one or more auxillary pairs of hydraulically operated and controllable lines powered by the vehicle and extending forwardly therefrom for providing sources of hydraulic power that can be controlled by the operator within the vehicle to energize hydraulic motors, cylinders and the like carried by the implement attached to the vehicle, or for other desired purposes. For simplicity in illustrating the invention and for clarity in the figures, such hydraulic lines are not illustrated in the Drawings, but are understood to exist and to extend from and between the vehicle to the various hydraulic devices to be hereinafter described, for effecting proper operation thereof. An example of such a hydraulic circuit as used to energize the hydraulic portions of the present invention will be described in more detail with respect to FIG. 9.

A more detailed description of the spreader bucket assembly 20 of the present invention is illustrated in FIGS. 3-8. Referring thereto, the bucket assembly 20 generally includes opposed left and right end plates 21 and 22, a bottom wall plate 23 extending laterally between the end plates 21 and 22, a back wall plate 24, and a lower inside back contour plate 25 laterally extending between the end plates 21 and 22 and forming a curved transition surface between the bottom plate 23 and the back wall 24. The back wall 24 defines a broad curvilinear surface extending from the bottom plate 23 toward an upper edge 24a. Secured to the upper edge 24a of the back wall plate 24 is an angled plate 27 providing a flat upper edge for the bucket. The end plates 21, 22 and the bottom and back plates 23, 24 as well as the inside back contour plate 25, cooperatively define a scoop or bucket cavity or a vessel for retainably holding material, in a manner well known in the art.

In the preferred embodiment of the spreader bucket assembly illustrated, the lower forward edge of the bucket assembly is reinforced by a relatively thicker portion of steel blade edge material 28 which extends across the width of the forward edge of the bottom plate 23 and partially up along the front forward side edges of the end plates 21 and 22. Additional reinforcement members 29 are mounted on each side of the bucket assembly adjacent the lower forward edges thereof and mount pivot supports 30 for an auger movement assembly to be described in more detail hereinafter. The bucket assembly further includes lower and side reinforced skid wear bars 31 for facilitating sliding motion of the bucket along the ground.

Figure 6:
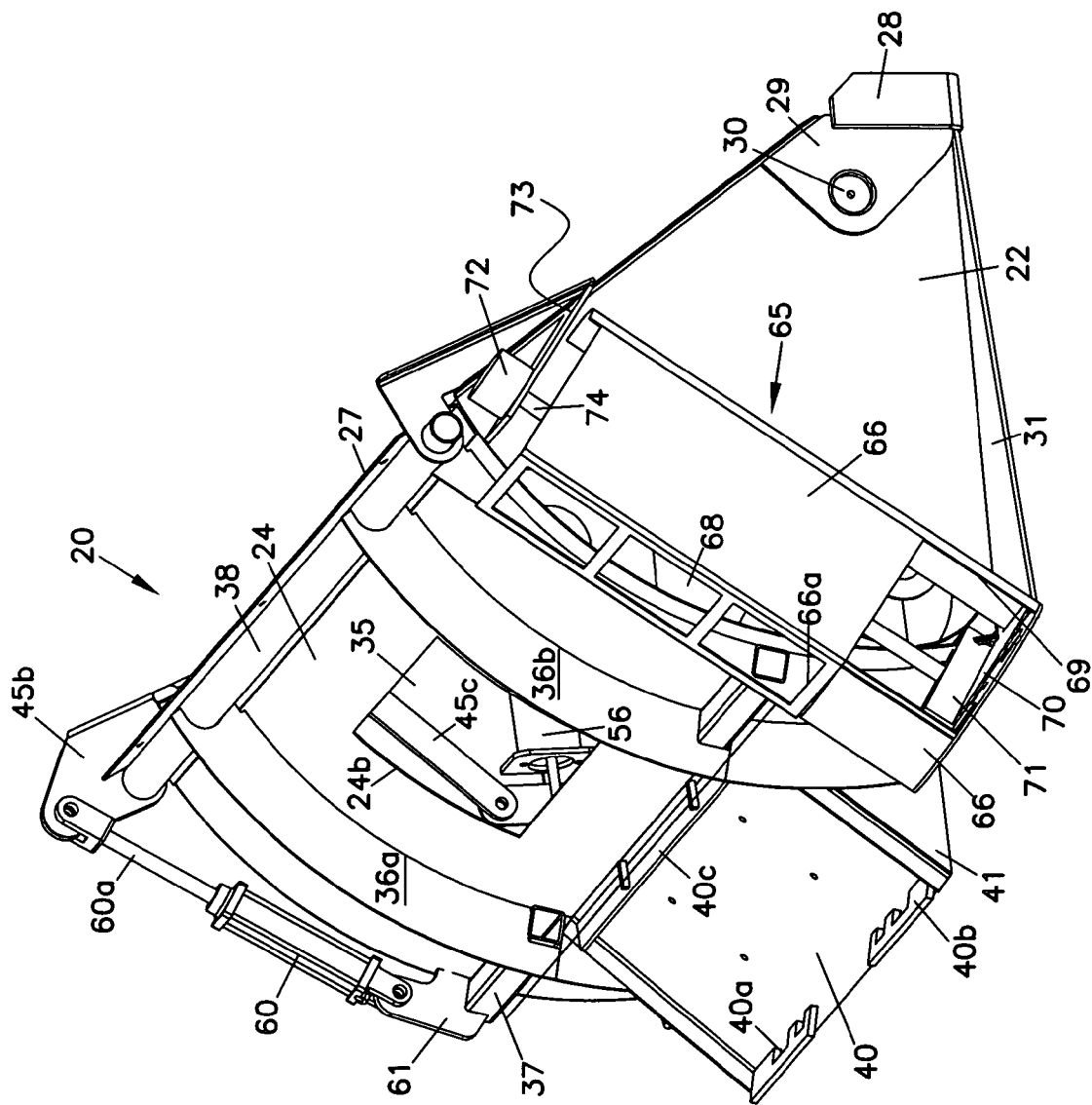
FIG. 6 is an enlarged top, side, rear perspective view of the spreading bucket assembly of FIGS. 1 and 2, illustrating the auger assembly thereof in the first, lowermost position.

The back wall plate 24 defines a viewing port opening 24*b* therethrough which is covered by a transparent plastic member 35 to enable an operator within the vehicle 10 visual inspection through the rear wall of the bucket and into its inner cavity. The right end plate 22 also defines an opening extending therethrough, generally indicated at 22*a* and extending from bottom to top of the bucket along the edge of the curvilinear back wall plate 24, to define a discharge port or chute opening into the spreader apparatus to be hereinafter described. A pair of left and right back support gussets 36*a* and 36*b* respectively are welded to the outer surface of the back wall plate 24 and provide rigidity and support thereto, as illustrated in FIG. 6. A lower tubular support 37 extends laterally across the lower back portion of the back wall plate 24 and is secured by the gussets 36 and welded to the back wall 24 to provide additional strength to the bucket. An upper cylindrical cross tube support 38 extends across the upper edge of the back wall 24 and is mounted under and to the upper angled plate 27 and to the upper portions of the back support gussets 36.

Figure 8:
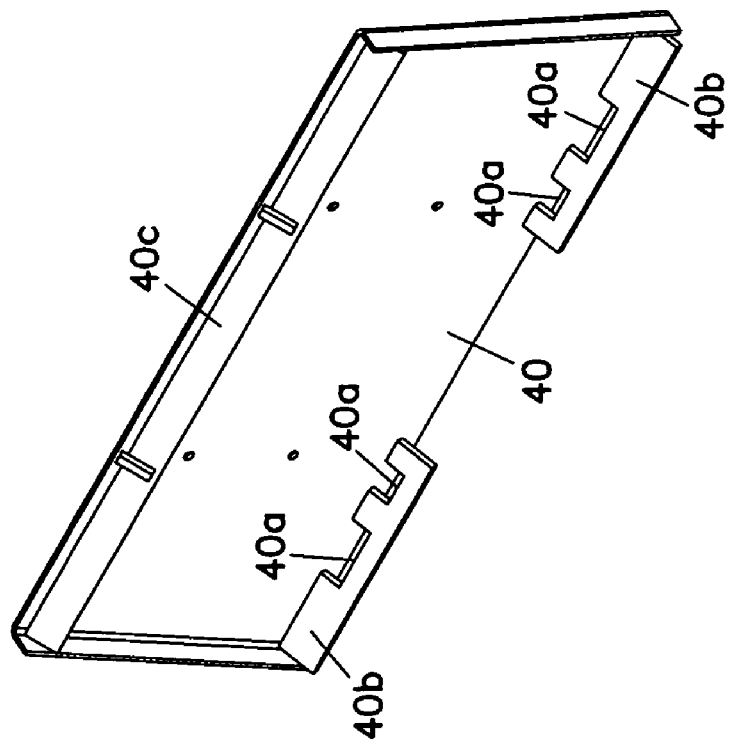
FIG. 8 is a perspective view of the hitch plate portion of the spreading bucket assembly of FIGS. 6 and 7.

A standard quick hitch mounting plate 40 is welded to a pair of mounting gusset support plates 41 to the rear wall 24, and to the back support gussets 36. A more detailed view of the standard quick hitch mounting plate 40 is illustrated in FIG. 8. Referring thereto, the mounting plate 40 includes a plurality of engagement notches, generally indicated at 40*a* in a pair of lower mounting bracket portions 40*b* and an angled upper retainer cam member 40*c*, which cooperatively engage the universal mounting bracket arms of the skid steerable vehicle, in a manner well known in the art, for enabling detachable secured movement of the bucket assembly by the movable operator arms of the vehicle 10.

Figure 3:
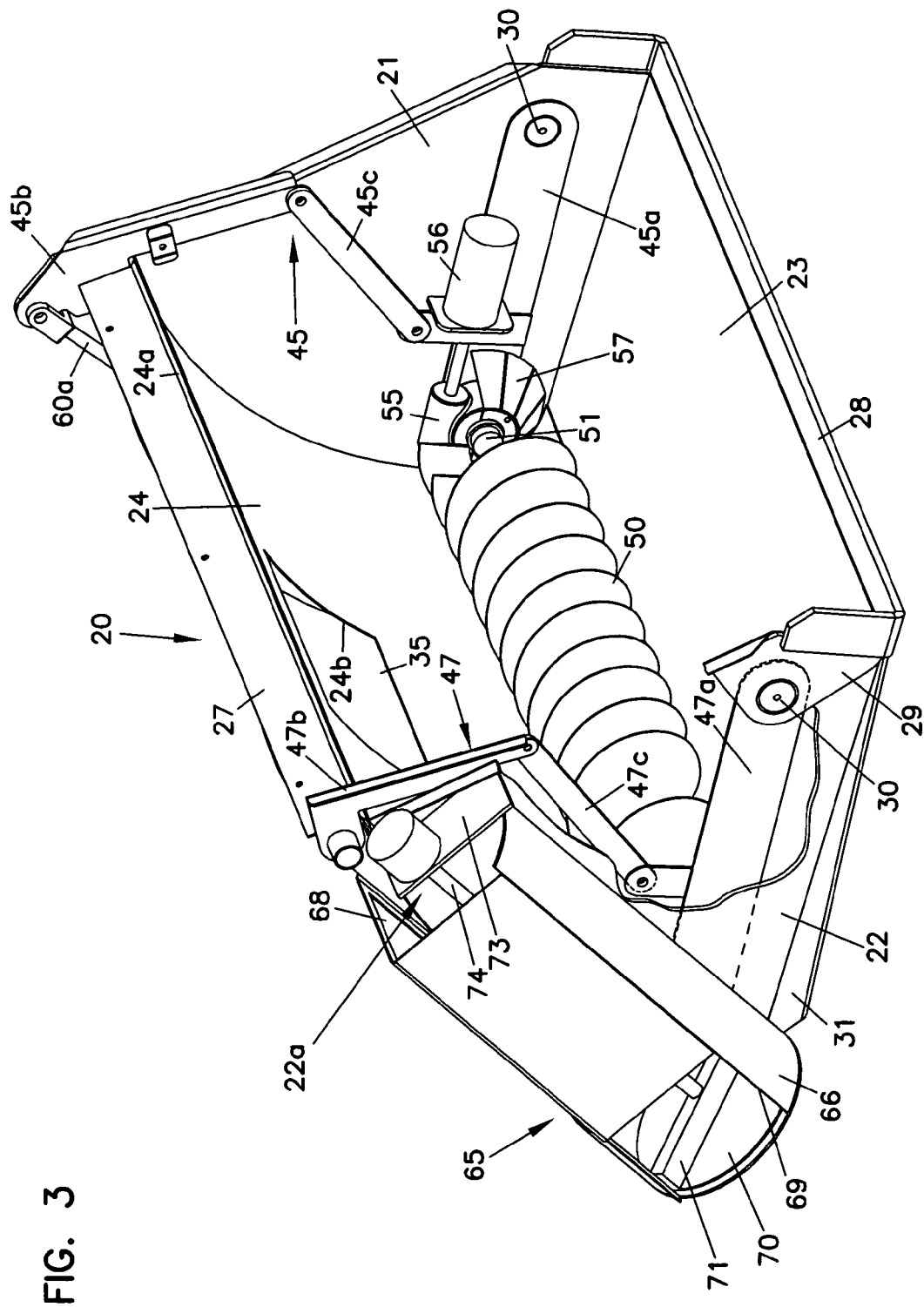
FIG. 3 is an enlarged top, side, front perspective view of the spreading bucket assembly of FIGS. 1 and 2, illustrated the auger assembly thereof at a first, lowermost position, and with a portion of the right wall thereof broken away.

A pair of left and right auger lift arm linkage assemblies 45 and 47 respectively pivotally support an auger 50 for cooperative arcuate movement relative and parallel to and in close proximity with the inner curvilinear surface of the back wall plate 24. The left auger lift arm linkage assembly, best illustrated in FIGS. 3-5 includes a lower linkage arm 45*a* pivotally mounted to the left end plate 21 by means of the auger pivot support 30, an upper linkage arm 45*b* pivotally mounted for rotation about the distal end of the upper cross tube 38, and an intermediate linkage arm 45*c* pivotally mounted respectively to the lower end of the upper linkage arm 45*b* and to an intermediate portion of the lower linkage arm 45*a*. The right auger lift arm linkage assembly is virtually a mirror image of the above-described left auger lift arm linkage assembly, and moves in unison with the left auger left arm assembly 45, and is illustrated in FIG. 3. The auger 50 is mounted for pivotal rotation about its longitudinal axis between the distal ends of the lower linkage arms 45*a* and 47*a* of the left and right auger lift arm linkage assemblies. The left end of the axially aligned central shaft 51 of the auger 50 is operatively mounted to be driven by a gear and transmission assembly 55 that is driven by a hydraulic motor 56 mounted to the central arm portion of the lower linkage arm 45*a*. A protective shroud 57 surrounds and shields the gear assembly 55 from the contents of the bucket. The non-driven distal end of the auger shaft 51 is pivotally mounted for rotation within the movable distal end of the lower linkage arm 47*a*.

Figure 4:
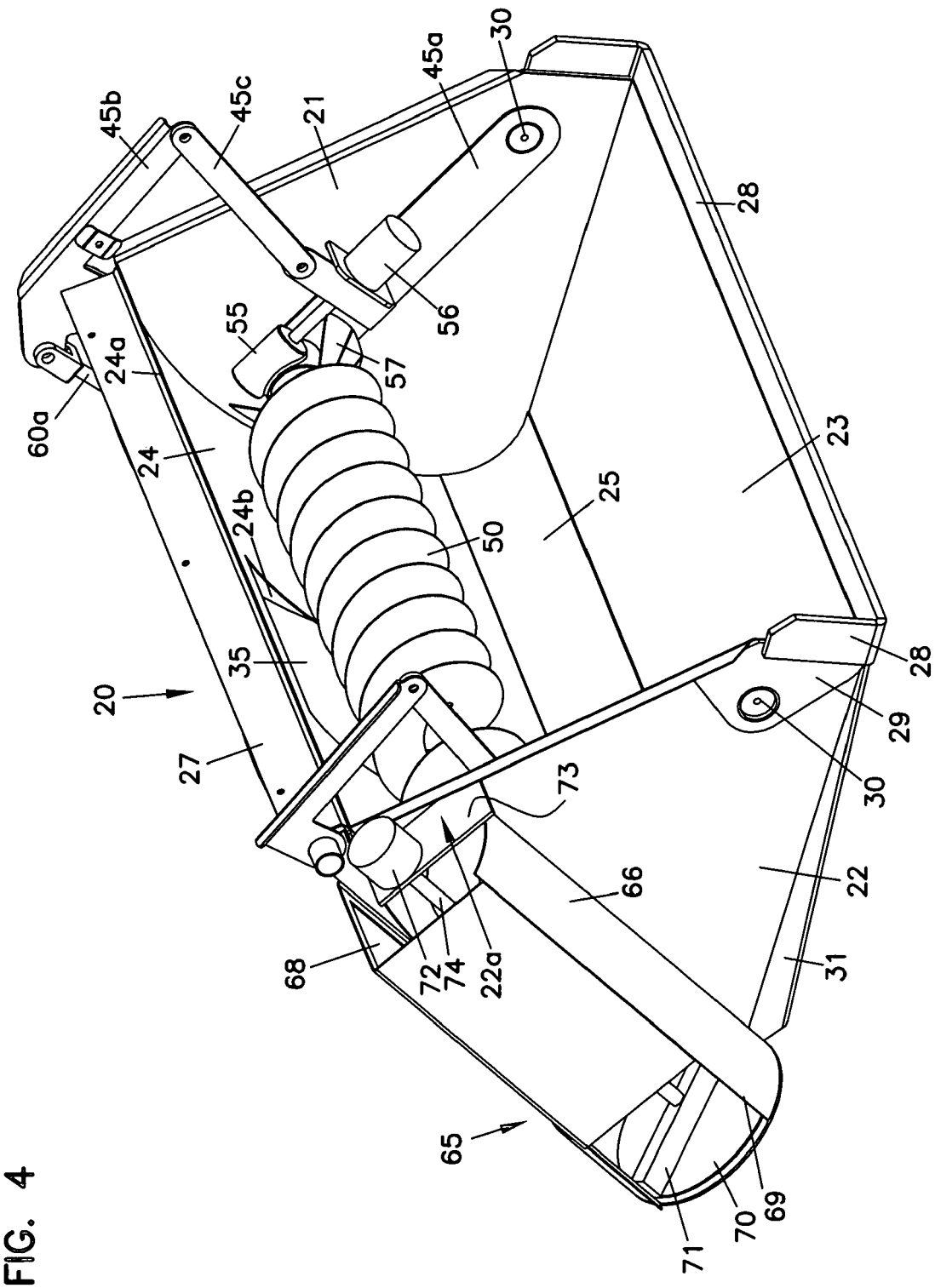
FIG. 4 is a perspective view of the spreading bucket assembly of FIG. 3, illustrating the auger assembly thereof at an intermediate position.
Figure 5:
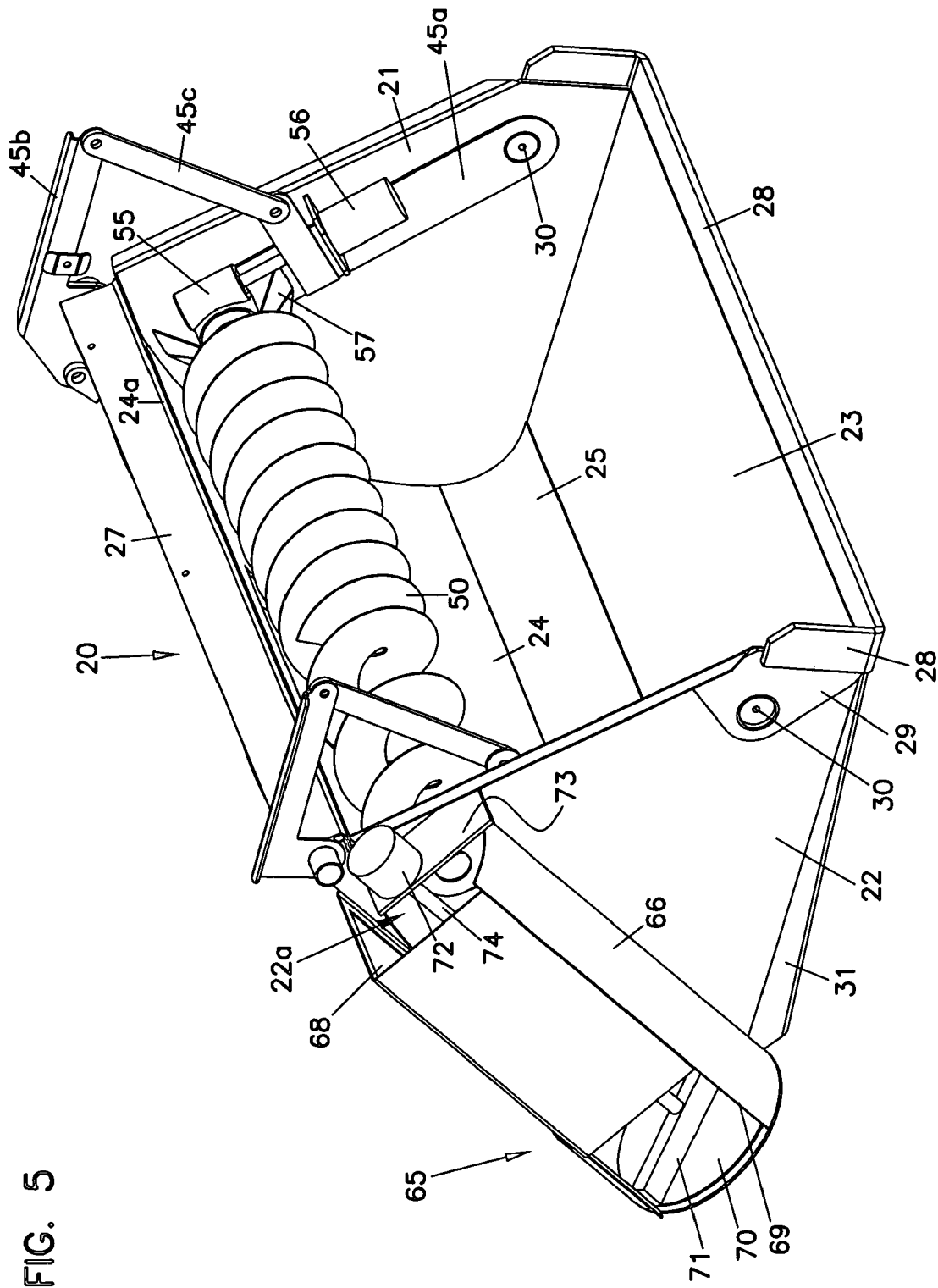
FIG. 5 is a perspective view of the spreading bucket assembly of FIG. 3, illustrating the auger assembly thereof at an uppermost position.
Figure 7:
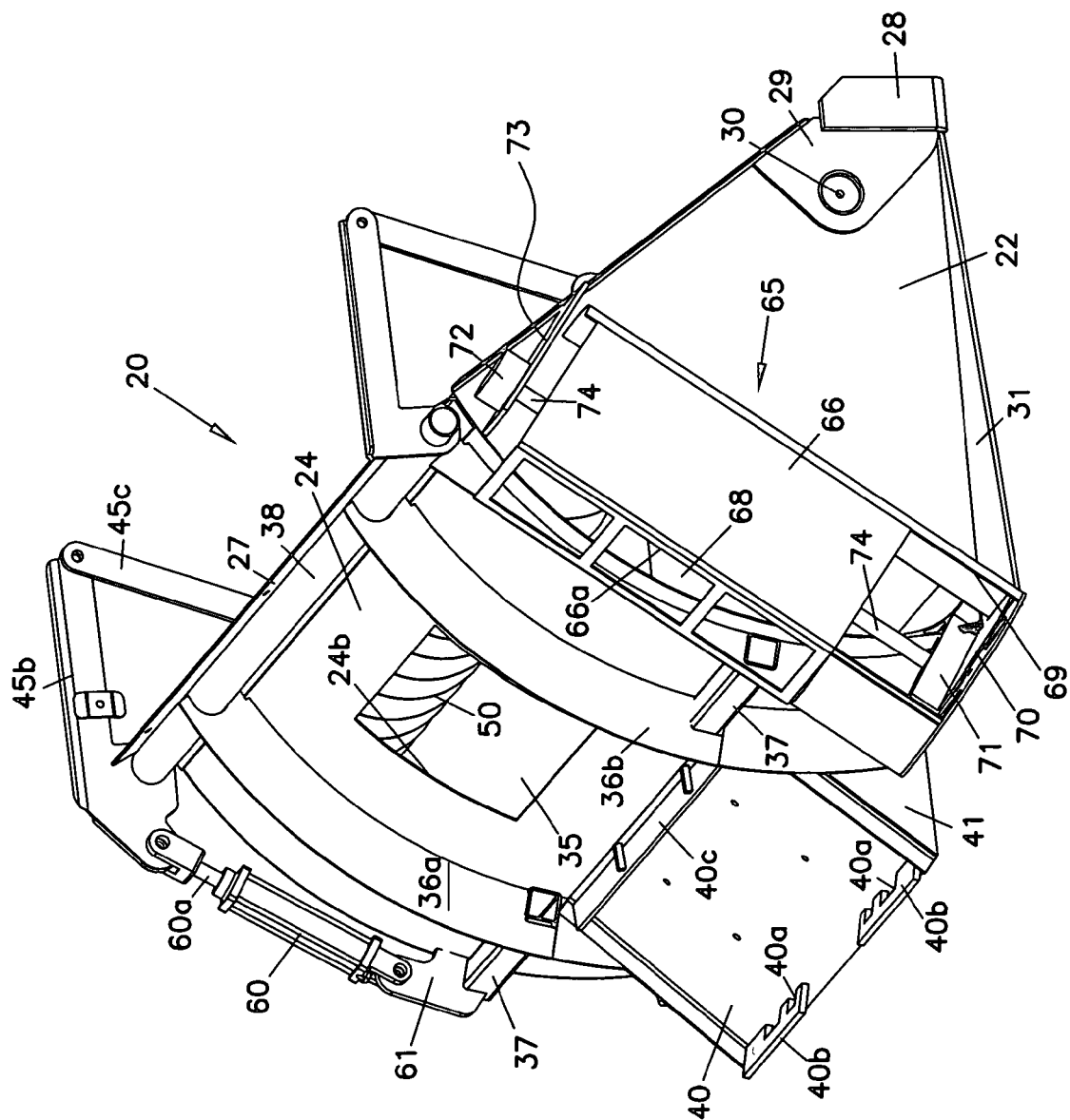
FIG. 7 is a perspective view of the spreading bucket assembly of FIG. 6, illustrating the auger assembly thereof at an uppermost position.

The upper end of the upper linkage arm 45*b* is connected to the movable piston 60*a* of a hydraulic cylinder 60. The lower end of the hydraulic cylinder 60 is secured by a mounting bracket 61 that is secured to the lower tubular support 37, as best illustrated in FIG. 6. As controlled by the hydraulic cylinder 60, the left and right auger lift arm linkage assemblies 45 and 47 cooperatively move the auger 50 along and parallel to the inner curvilinear surface of the back wall of the bucket assembly from a lowermost position as illustrated in FIGS. 3 and 6, to an uppermost position as illustrated in FIGS. 5 and 7. An intermediate auger position is illustrated in FIG. 4. The uppermost, intermediate and lowermost auger positions relative to the rear wall 24 are diagrammatically illustrated respectively in FIGS. 10A, 10B and 10C.

A material spreader or slinger apparatus is generally illustrated at 65. The spreader is mounted to the right side wall or end plate 22 by means of its outer shroud or housing 66, that is connected to cooperatively surround the discharge port or chute opening 22*a* from the bucket interior formed through the right end plate 22. The back surface of the shroud 66 includes a plurality of openings 66*a* formed therethrough which are covered by a transparent plastic or plexiglass member 68 which enables an operator of the vehicle 10 to view into the inner cavity of the material spreader 65. The right most portion of the spreader shroud 66 defines a discharge port or outlet 69 from the spreader through which material is ejected from the spreader. A disk member 70 with an attached upright impellor assembly 71 are pivotally mounted between the bottom plate of the outer shroud 66 and a hydraulic motor 72 mounted to an upper mounting plate 73 of the shroud housing. The shaft connecting the output of hydraulic motor 72 to the impellor and lower disk members 71 and 70 respectively is illustrated at 74. As the motor 72 rotates the lower disk end impellor members, any material contained within the shroud housing as directed thereto by the auger, is forcefully ejected through the discharge port 69 of the shroud housing.

Figure 9:
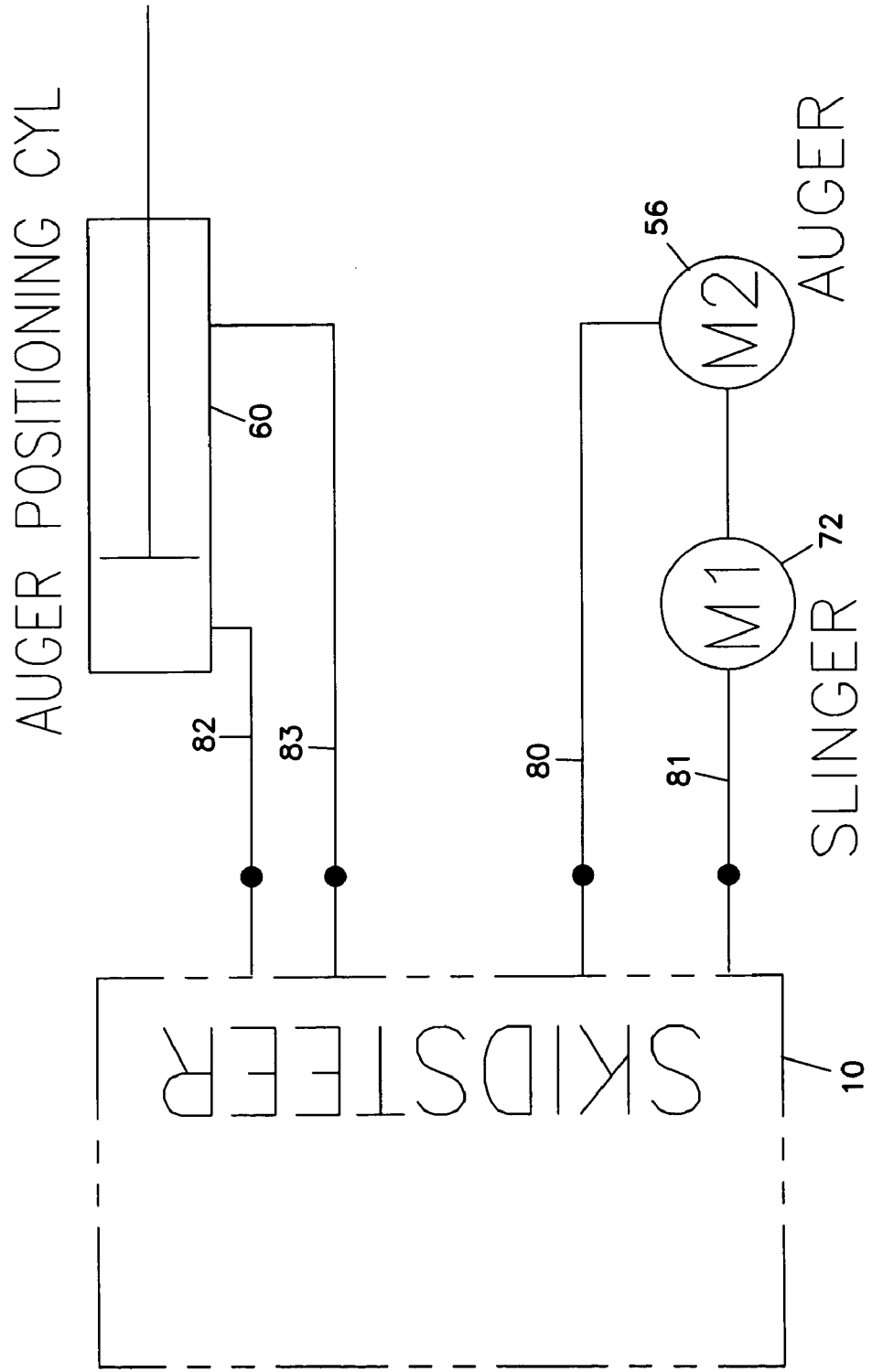
FIG. 9 is a schematic diagram of a hydraulic circuit for operating the spreading bucket assembly with a skid steerable vehicle such as in FIGS. 1 and 2.
Figure 10C:
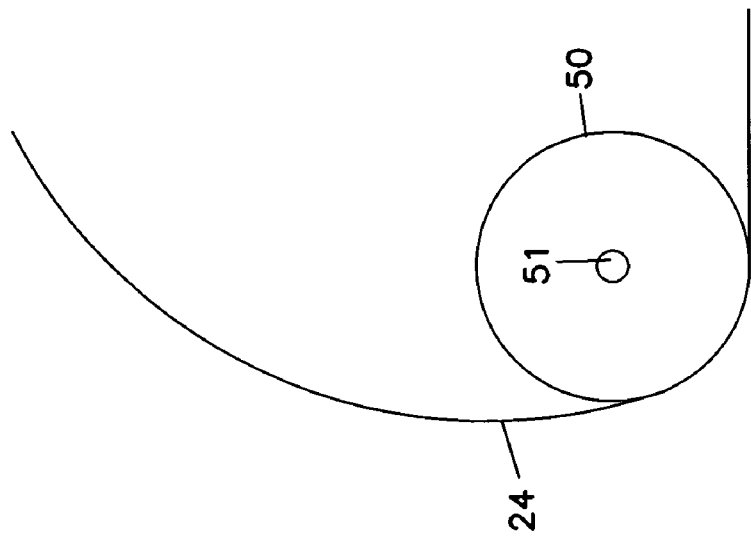
FIGS. 10A, 10B and 10C is a diagrammatic side view illustration of three positions of the auger of the spreading bucket assembly of the invention as positioned relative to the curvilinear rear inside wall of the bucket.
Figure 10B:
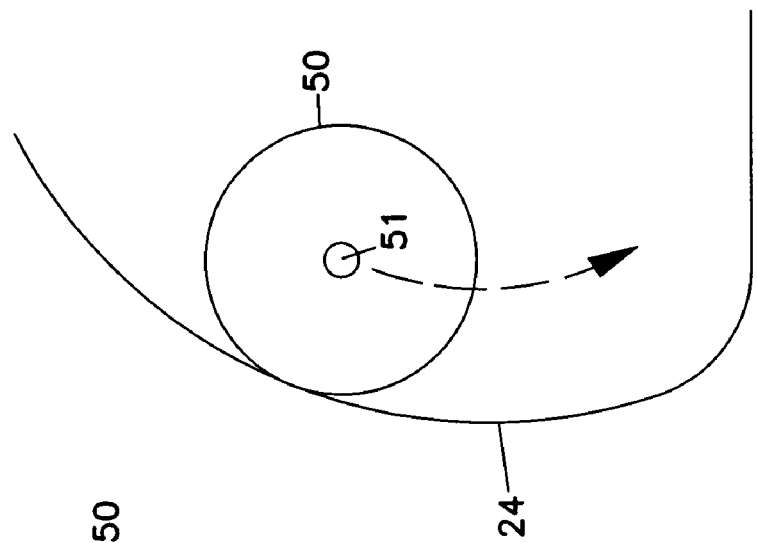
Figure 10A:
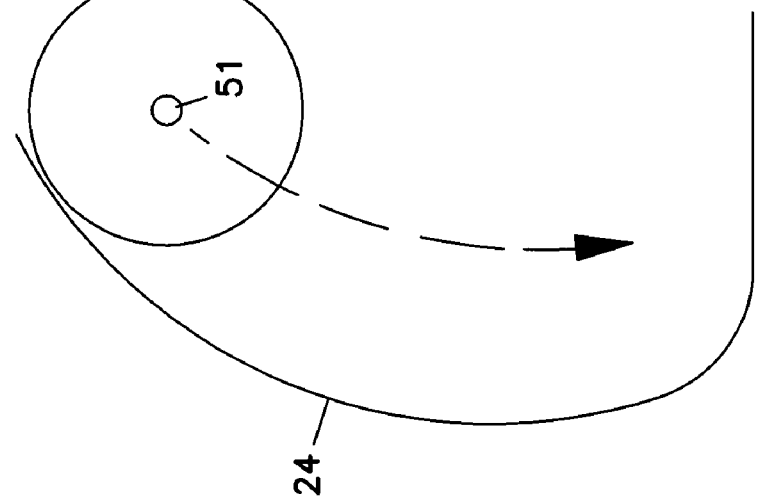

The auger motor 56, the slinger or spreader motor 72 and the auger positioning hydraulic cylinder 60 are energized by means of the auxiliary hydraulic output lines available from the skid steerer vehicle, as schematically illustrated in FIG. 9. For the system illustrated in FIG. 9, the skid steerable vehicle 10 has a dual auxiliary hydraulic control system available for use by the spreader bucket assembly. A first pair of hydraulic lines, generally indicated at 80 and 81, are operatively connected to energize the auger motor 56 and the spreader or slinger motor 72 in series. A second set of hydraulic lines, generally indicated at 82 and 83, are operatively connected to energize and control the auger positioning cylinder 60 for moving the auger in curvilinear fashion in close proximity to and adjacent to the inner surface of the bucket rear wall.

In the preferred embodiment, the auger 50 generally helical construction secured at its ends by shaft portions 51 aligned along a central longitudinal axis of the auger. In the preferred embodiment illustrated, the auger flighting is 12 inches in diameter and has a 9 inch pitch. It will be understood however, that augers of various sizes and configurations could be used within the spirit and intent of this invention. The auger pivot supports 30 for the linkage arms 45 and 47 are positioned along the left and right end plates 21 and 22 such that an axis drawn through the center of the pivot supports 30 defines a line that is the radial center line for the curvilinear surface defined by the inner surface of the back plate 24. As the hydraulic cylinder 60 activates the auger lift arm linkage assemblies 45 and 47, causing the lower linkage arms 45a and 47a thereof to pivot about the auger pivot supports 30, the outer edge surfaces of the auger flighting members move in close proximity to and along the curved inner surface of the back wall plate 24 of the bucket cavity. The speed of the hydraulic motors can be adjusted by adjusting the hydraulic fluid flow rates therethrough, as is well known in the art. In the preferred embodiment, the motors 56 and 72 are connected in series as shown in FIG. 9 and operate at a 14 gallon per minute flow rate. Similarly, the hydraulic fluid flow rate to the auger positioning cylinder 60 can be adjusted to desired design parameters. In the preferred embodiment, the hydraulic cylinder 60 is a 2×8 inch cylinder and operates on a 4 to 5 gallon per minute flow rate.

Operation of the spreader bucket configuration will be clearly understood by those skilled in the art. Once operatively engaged to the operator arms 14 of the skid steerable vehicle 10 by engagement to the quick hitch mounting plate 40 and proper connection of the hydraulic cylinder and motors 60, 56 and 72, to the auxiliary hydraulic control lines 80-83 of the vehicle, the spreader bucket assembly 20 is ready for operation. It is movable by the pair of vehicle operator lift arms 14 in an up and down manner relative to the ground, and is pivotable around the front mounting bracket portion of the operator arms to pivotally tip the bucket so as to change the inclination of the bottom plate 23 relative to the support surface or ground, in a manner well known in the art.

The transparent viewing panels 35 and 68 enable the operator of the vehicle to effectively and efficiently control the material spreading process. Panel 35 enables the operator to view the auger position within the bucket and relative to the upper surface of the material; whereas the viewing panel 68 provides the operator with a visual observation of how much material has accumulated within the material spreader 65 and its relative position therein.

In operation the bucket 20 is loaded in the fashion that all skid steerable operated buckets use. The vehicle moves the bucket into a position which addresses the pile of material to be loaded. The bucket is pivoted in a manner such that the open end of the bucket is positioned to engage the material to be loaded. Typically in a loading position, the bottom 23 of the bucket would be positioned parallel to the ground and slid therealong as the vehicle pushes the bucket into the pile of materials to fill or load the inner cavity portion of the bucket with a charge of material. Prior to loading the material into the bucket, the hydraulic cylinder 60 would be energized so as to cause the auger lift arm linkage assemblies 45 and 47 to lift the auger 50 into its uppermost position as illustrated in FIGS. 5 and 7. The material that is then loaded into the bucket will be loaded generally below the auger. After the material is loaded into the bucket, the operator pivots the bucket about the forward ends of the skid steering vehicle operator arms 14 to a position generally illustrated in FIGS. 1 and 2, to secure the loaded material within the bucket cavity and to position the material spreader or slinger mechanism 65 in a generally vertical orientation, as illustrated in FIG. 2.

The vehicle then transports the loaded material to the dispersion site, wherein the operator then lifts the bucket assembly by the pair of operator arms 14 to a desired height for spreading of the material. This position is not illustrated in the figures. The lifted spreading bucket is oriented relative to the area in which the material is to be spread such that the discharge outlet port 69 of the material spreader 65 faces the area into which the material is to be ejected. Virtually any particulate type of material can be dispersed by the system. For example, if the material being spread is wood shavings or chopped straw or sawdust that could be used for a bedding material in a barn stall, the bucket would be positioned at a height and position calculated to spread the bedding material uniformly throughout the stall. To initiate the spreading function, the operator energizes the auger positioning hydraulic cylinder 60 to lower the auger flights into engagement with the upper surface of the material if they are not already in such engagement, and energizes the hydraulic auger and spreader motors 56 and 72 so as to begin rotation of the auger and the slinger impellor and disk 71, 70 at the discharge port 69.

The rotating auger will direct material it engages toward and through the discharge port and chute 22a through the right end plate of the bucket and into the material spreader 65. Such material will fall by gravity onto the spinning disk and impellor assemblies which will eject the material through the spreader discharge port 69 in a broadcasting manner. Since the auger is continually moving the contained material within the bucket or vessel from the material's uppermost surface, bridging of the material is eliminated or minimized. As the material is removed from the bucket during the spreading process, the operator simply periodically activates the auger positioning cylinder 60 so as to downwardly move the auger position along the curvilinear inner surface of the back plate of the bucket, thereby continually removing material from the top of the contained material. The process continues until the operator decides to terminate the spreading function, or until all of the material has been emptied from the bucket. The close cooperative movement association between the auger flights and the inner curvilinear surface of the back of the bucket does not allow the material to stick to the inner bucket surfaces in a manner that causes bridging. Further, the auger is never submerged below or buried by the material contained within the bucket during rotational operation of the auger. Therefore, the auger is not subjected to heavy forces or stresses caused by the material weight, providing a more efficient and reliable system.

In the preferred embodiment, the spreader bucket assembly is configured from relatively light-weight materials and is a fairly large bucket capable of handling significant quantities of material to be spread. It will be understood by those skilled in the art, however, that the configuration of the vessel which holds the material to be spread can assume many different configurations. While a movable bucket configuration has been illustrated with respect to the preferred embodiment description of the invention, the invention is not limited to any particular bucket configurations or to a bucket-type vessel, but could also apply to other types of vessels. Further, while the preferred embodiment of the invention has employed an auger assembly that moves relative to the wall of the bucket, the invention would also apply to a system wherein the wall of the vessel moves relative to the auger. The significance of the invention is the concept of relative cooperative movement between the auger and the curvilinear surface of the material containing vessel so as to direct material from the vessel through an outlet port or into a spreader or slinger assembly in a manner that eliminates or minimizes bridging of the material within the vessel. Other forms of vessels such as trailable or towed vessel configurations can be configured to incorporate and practice the principles of this invention.

It will be appreciated that while a preferred embodiment, description and application of the invention have been disclosed, other modifications of the invention not specifically disclosed or referred to herein will be apparent to those skilled in the art in light of the foregoing description. This invention is intended to provide a specific example of a preferred embodiment structure and application which clearly discloses the apparatus and method of the present invention and its operative principles. Accordingly, the invention is not limited to any particular embodiment or configuration or component parts thereof or to the use of any particular materials for their construction. All alternatives, modifications, and variations of the present invention which fall within the spirit and broad scope of the appended claims are covered.

I claim:

1. A dispensing apparatus for particulate material comprising:
   (a) a vessel configured to retainably hold a charge of particulate material to be dispensed, said vessel comprising:
      (i) opposed end walls;
      (ii) a bottom wall laterally extending between and connected to the opposed end walls;
      (iii) a back wall obliquely connected to said bottom wall and laterally extending between and connected to said end walls, said back wall having an inner surface extending longitudinally from said bottom wall substantially to an upper edge of the vessel; and
      (iv) said vessel defining an outlet port through which said particulate material passes when dispensed from said vessel, said outlet port being formed through at least one of said opposed end walls or said back wall and extending substantially from said bottom wall and substantially up to said vessel upper edge;
   (b) an auger having an axis of rotation and mounted within the vessel such that the auger axis of rotation is generally parallel to the inner surface of said back wall, said auger having a plurality of flights being configured and operable to move said particulate material within said vessel toward and through said outlet port; and
   (c) operator apparatus connected to rotate the auger about said axis of rotation and to longitudinally move the auger along the inner surface of the back wall from substantially the vessel upper edge to said bottom wall and such that the auger flights are maintained in close operative proximity to the inner surface as the auger dispenses said particulate material through said outlet port; and
   (d) wherein said auger moves the particulate material through said outlet port at substantially any longitudinal position along said inner surface of the back wall while removing the charge of material from the vessel from an upper surface of the charge.

2. The dispenser apparatus of claim 1, wherein said outlet port is positioned through one of said opposed end walls.

3. The dispenser apparatus of claim 1, wherein the vessel is an open vessel.

4. The dispenser apparatus of claim 3, wherein the vessel is configured as a bucket suitable for connection as an implement to a tractor.

5. A particulate material dispensing apparatus comprising:
   (a) an open vessel configured to retainably hold a charge of particulate material to be dispensed, said vessel comprising:
      (i) opposed left and right generally planar end plates;
      (ii) a lower generally planar wall member laterally extending between and connected to the opposed end plates;
      (iii) a back wall connected to said lower wall member and laterally extending between and connecting said opposed end plates, said back wall extending longitudinally from said lower wall member to an upper edge of the vessel, wherein said back wall defines a broad curvilinear surface extending from said lower wall and substantially up to said upper edge of the vessel; and
      (iv) said vessel defining an outlet port through which said particulate material is directed from said vessel, said outlet port passing through at least one of said opposed end plates or said back wall, said outlet port extending substantially from said lower wall and substantially up to said vessel upper edge;
   (b) an auger having an axis of rotation and mounted within the vessel such that the auger axis of rotation is generally parallel to said broad curvilinear surface, said auger having a plurality of flights operable to move said material within said vessel toward and through said outlet port; and
   (c) operator apparatus operatively connected to rotate the auger about said axis of rotation and to position said auger and said curvilinear surface for relative cooperative movement such that the auger axis is arcuately moveable substantially between the vessel upper edge and said lower wall so as to maintain the auger flights in close operative proximity to said broad curvilinear surface as the auger dispenses said particulate material through said outlet port; wherein during dispensing of said particulate material, said auger is positioned overlying said charge of material in said vessel such that said auger engages said material and dispenses said material from the vessel from the top of the charge of material.

6. The dispensing apparatus of claim 5, further including a spreader apparatus mounted to said vessel adjacent said outlet port, positioned to receive said material leaving said vessel through said outlet port and operable to dispense said material externally of said vessel in a broadcast manner.

7. The dispensing apparatus of claim 5, wherein said vessel comprises a bucket member.

8. The dispensing apparatus of claim 5, wherein said vessel is configured for attachment to a vehicle.

9. The dispensing apparatus of claim 5, wherein said operator apparatus comprises a linkage operatively connecting said auger to and for movement relative to said vessel.

10. The material dispensing apparatus as recited in claim 5, wherein said outlet port is positioned through at least one of said left or right opposed end plates of said vessel.

* * * * *